US012624787B2

(12) United States Patent
Renk

(10) Patent No.: US 12,624,787 B2
(45) Date of Patent: May 12, 2026

(54) FLUID LEAK RETENTION AND DRAINAGE KIT

(71) Applicant: Doreen Renk, West Allis, WI (US)

(72) Inventor: Doreen Renk, West Allis, WI (US)

( * ) Notice: Subject to any disclaimer, the term of this patent is extended or adjusted under 35 U.S.C. 154(b) by 0 days.

(21) Appl. No.: 18/754,808

(22) Filed: Jun. 26, 2024

(65) Prior Publication Data

US 2026/0002622 A1 Jan. 1, 2026

(51) Int. Cl.
| *G01M 3/18* | (2006.01) |
| *F16L 55/00* | (2006.01) |
| *G01M 3/04* | (2006.01) |

(52) U.S. Cl.
CPC .............. *F16L 55/00* (2013.01); *G01M 3/04* (2013.01); *G01M 3/186* (2013.01); *Y10T 137/5762* (2015.04)

(58) Field of Classification Search
CPC . Y10T 137/5762; D06F 39/081; G01M 3/186
USPC ........................................................ 220/571
See application file for complete search history.

(56) References Cited

U.S. PATENT DOCUMENTS

| 5,199,457 A | 4/1993 | Miller | |
| 5,339,676 A | 8/1994 | Johnson | |
| 5,931,184 A * | 8/1999 | Armenia | A47L 15/421 |
| | | | 285/123.1 |
| 6,102,073 A * | 8/2000 | Williams | A61M 1/84 |
| | | | 137/561 R |
| 6,412,638 B1 * | 7/2002 | Carter | B65D 1/34 |
| | | | 220/571 |

| 6,679,400 B1 * | 1/2004 | Goodman | B67D 1/16 |
| | | | 222/108 |
| 7,561,057 B2 * | 7/2009 | Kates | G01M 3/186 |
| | | | 340/622 |
| 8,430,115 B2 * | 4/2013 | Stieb | F17D 5/06 |
| | | | 137/391 |
| 8,823,532 B1 | 9/2014 | Carlblom | |
| 9,140,277 B2 * | 9/2015 | McMillen | E04B 9/0428 |
| 11,079,347 B1 * | 8/2021 | Beasley | G08B 21/20 |
| 11,313,751 B1 | 4/2022 | Mcgehee et al. | |
| 2004/0065355 A1 | 4/2004 | Demartini | |

(Continued)

OTHER PUBLICATIONS

Diversitech "Diversitech—Metal Dran Pan" Model: 6-M3060, https://www.ecomfort.com/Diversitech-6-M3060/p151299.html?gad_source=1&gclid=EAIaIQobChMIpl-1tNHOgwMV9VtHAR3gnwAIEAQYAyABEgJhw_D_BwE, Retrieved from internet Nov. 19, 2024, pp. 6.

(Continued)

*Primary Examiner* — Kevin F Murphy
(74) *Attorney, Agent, or Firm* — Fredrikson & Byron, P.A.

(57) ABSTRACT

A fluid leak retention and drainage kit includes a fluid retention body. The fluid retention body includes an internal fluid retention volume. The internal fluid retention volume is formed by a plurality of retention body walls each comprising a first wall end and a second wall end, a sloped base comprising a drainage opening, a lip disposed on the second wall end, and a hose barb extending from the drainage opening. The sloped base is disposed at the first wall end and defines a drainage slope configured to direct fluid to the drainage opening. The lip is configured to attach the fluid retention body to a fluid retention body support surface. The kit includes a hose attachable to the hose barb. The hose is configured to output fluid to a different location.

17 Claims, 3 Drawing Sheets

(56) References Cited

U.S. PATENT DOCUMENTS

| | | |
|---|---|---|
| 2008/0307857 A1 | 12/2008 | Atiya |
| 2013/0185865 A1 | 7/2013 | Joehnck |
| 2015/0375889 A1 | 12/2015 | Brockman |
| 2018/0320352 A1 | 11/2018 | Clifford |

OTHER PUBLICATIONS

Driptite "Driptite Protector Pans" http://www.driptite.com/drip_pans_washing_machines_washer_pans_order.htm, Retrieved from internet Nov. 19, 2024, pp. 8.
Killarney Metals "Sink Drip Pans" https://www.killarneymetals.com/604-sink-drip-pans, Retrieved from internet Nov. 15, 2024, pp. 1.
Killarney Metals "Under Sink Pan" https://www.killarneymetals.com/sink-drip-pans/113-under-sink-pan---3425-x-225-x-15---stainless-steel.html, Retrieved from the internet Nov. 19, 2024, pp. 1.
Killarney Metals "Front-Load Washer Floor Tray with Drain" https://www.killarneymetals.com/washer-pans/8236-front-load-washer-floor-tray-with-drain---32-x-30---galvanized-steel.html?gad_source=1#.XfQE6mRKhPY&gclid=Cj0KCQiAtOmsBhCnARIsAGPa5yZeiSIQqxP3zfHlpnUf4NvAll_i-k7pWV4L8ezAVNohDhaWoubrrSMaAt4WEALw_wcBm, retrieved from internet Nov. 15, 2024, pp. 1.
MHHA "Under Sink Mat for Kitchen Waterproof, 34×22 Silicone Bathroom Sink Mat, Under Sink Liner Drip Tray and Protectors for Bottom of kitchen Sink" Amazon.com, https://www.amazon.com/MHHA-Under-Sink-Mat-Grey/dp/B0C6K79RBKref=asc_df_B0C6K79RBKtag=hyprod-20&linkCode=df0&hvadid=673692543112&hvpos=&hvnetw=g&hvrand=13063859370209658017&hvpone=&hvptwo=&hvqmt=&hvdev=c&hvdvcmdl=&hvlocint=&hvlocphy=9003544&hvtargid=pla-2202204399827&mcid=09ea42c1b0cc3946be4c1425c43d5700&th=1, Date first available Jul. 23, 2023, pp. 8.

* cited by examiner

FLUID LEAK RETENTION AND DRAINAGE KIT

FIELD

The various embodiments herein relate to fluid leak retention kits.

BACKGROUND

Water fixtures are ubiquitous in structures of all kinds across the developed world and serve to provide a necessary source of water for a wide variety of purposes. However, water fixtures can be susceptible to water leakage from the water fixture, which can lead to significant issues, including potentially costly damage if unaddressed. Leaks can go undetected for long periods of time, depending on whether the location of the leak can be viewed or accessed.

Various means can be used to catch water. For example, some approaches to mitigating leaks can include placing an object adjacent the water fixture to attempt to catch leaking water. While such an object may be able to catch leaking water if the leak is known and if the object is accurately positioned, it does not redirect water to a secondary location. Without the ability to dispose of accumulated, collected leaking water, the use of such a catch object merely delays water leak problems for a time that is a function of that catch object's volume. Moreover, water may remain stagnant in the catch object, which can be unsanitary and potentially pose an allergic-inducing hazard.

BRIEF SUMMARY

Discussed herein are various embodiments of kits for fluid leak mitigation and fluid leak retention. The kits include a fluid leak retention body that includes a flange or lip and a hose barb, a hose, and a container configured to receive leaked fluid. Some embodiments of the kits further include grates. Such kits can be installed in cabinets while retaining storage uses of the cabinet. And such embodiments can be configured to dispose of collected, leaking water to thereby provide a type of continuous leak remediation function.

The kits described herein can be used to mitigate damage caused by leaking pipes. As liquids (such as water) leak from water fixtures, the accumulation of fluid can result in costly damage. By collecting and/or moving the water, a user can be made aware of a leak and continuously monitor said leak.

One embodiment of a fluid leak retention and drainage kit comprises a fluid retention body and a hose. The fluid retention body comprises an internal fluid retention volume. The internal fluid retention volume is formed by a plurality of retention body walls each comprising a first wall end and a second wall end, a sloped base comprising a drainage opening, a lip disposed on the second wall end, and a hose barb extending from the drainage opening. The sloped base is disposed at the first wall end. The sloped base defines a drainage slope configured to direct fluid to the drainage opening. The lip is configured to attach the fluid retention body to a fluid retention body support surface. The hose is attachable to the hose barb. The hose comprises a first hose end and a second hose end. The first hose end is configured to fluidly couple to the hose barb and the second hose end is configured to output fluid at a location different than the internal fluid retention volume.

In a further embodiment of the fluid leak retention and drainage kit, the kit further comprises a grate. The grate comprises a flat storage surface, a drainage opening facing surface, and a plurality of fluid openings extending from the flat storage surface to the drainage opening facing surface. The grate is configured to be disposed above the fluid retention body. In this further embodiment, the grate covers at least portion of the fluid retention body.

In a further embodiment of the fluid leak retention and drainage kit, the fluid retention body support surface is a cabinet floor, the cabinet floor not being integral to the fluid leak retention and drainage kit.

In a further embodiment of the fluid leak retention and drainage kit, the sloped base comprises a negative slope defined from the first wall end to the drainage opening.

In a further embodiment of the fluid leak retention and drainage kit, first lip comprises a length of approximately at least 2 inches. The first lip is configured to be supported at a support substrate. A second lip comprises a length of approximately 2 inches.

In a further embodiment of the fluid leak retention and drainage kit, the kit comprises a leak monitoring device configured to detect the presence of fluid at the location different than the internal fluid retention volume. In this further embodiment of the fluid leak retention and drainage kit, the leak monitoring device comprises a leaked fluid quantity measurement device. The hose is configured to transport fluid from the fluid retention body at the first hose end to the leaked fluid quantity measurement device at the second hose end.

In a further embodiment of the fluid leak retention and drainage kit, the fluid retention body is formed by an integrated single sheet of metal.

One embodiment of a fluid leak retention and drainage kit comprises a fluid retention body and a hose. The fluid retention body comprises an internal fluid retention volume. The internal fluid retention volume is formed by a plurality of retention body walls each comprising a first wall end and a second wall end, a sloped base comprising a drainage opening, at least two flanges each disposed on two opposite retention body walls, and a hose barb extending from the drainage opening. The sloped base is disposed at the first wall end of the plurality of retention body walls. The sloped base defines a drainage slope configured to direct fluid to the drainage opening. Each flange is configured to attach the fluid retention body to a fluid retention body support surface. The hose is attachable to the hose barb. The hose comprises a first hose end and a second hose end. The hose is configured to output fluid to a location different than the internal fluid retention volume.

In a further embodiment of the fluid leak retention and drainage kit, the fluid retention body support surface comprises a joist, the joist not being integral to the fluid leak retention and drainage kit. Additionally or alternatively, the at least two flanges comprise a first flange extending outwardly from the retention body wall a first flange protrusion length and a second flange extending outwardly from the retention body wall at a second flange protrusion length. The first flange protrusion length of the first flange is less than the second flange protrusion length of the second flange.

In a further embodiment of the fluid leak retention and drainage kit, each flange comprises a fastener opening configured to receive a fastener.

In a further embodiment of the fluid leak retention and drainage kit, the hose barb is disposed at approximately 90 degrees from the sloped base. The drainage opening has a diameter of approximately 1 inch.

In a further embodiment of the fluid leak retention and drainage kit, the kit further comprises a leak monitoring device configured to detect the presence of fluid at the location different than the internal fluid retention volume. Additionally or alternatively, the leak monitoring device comprises a leaked fluid quantity measurement device. In this further embodiment, the hose is configured to transport fluid from the fluid retention body at the first hose end to the leaked fluid quantity measurement device at the second hose end.

In a further embodiment of the fluid leak retention and drainage kit, the fluid retention body is formed by an integrated single sheet of metal.

In a further embodiment of the fluid leak retention and drainage kit, the sloped base comprises a negative slope defined from the first wall end to the drainage opening.

While multiple embodiments are disclosed, still other embodiments will become apparent to those skilled in the art from the following detailed description, which shows and describes illustrative embodiments. As will be realized, the various implementations are capable of modifications in various obvious aspects, all without departing from the spirit and scope thereof. Accordingly, the drawings and detailed description are to be regarded as illustrative in nature and not restrictive.

BRIEF DESCRIPTION OF THE DRAWINGS

The following drawings are illustrative of particular examples of the present invention and therefore do not limit the scope of invention. The drawings are not necessarily to scale, though embodiments can include the scale illustrated, and are intended for use in conjunction with the explanations in the following detailed description wherein like reference characters denote like elements. Examples of the present invention will hereinafter be described in conjunction with the appended drawings.

DETAILED DESCRIPTION

The embodiments herein relate to fluid leak retention kits (also referred to herein as 'kits'). Such kits can be used to retain liquid leaking from faucets, pipes, or other plumbing. The fluid retention kits 20, 120 can be configured to remove water from the fluid leak retention body 22, 122 to a secondary location.

Figure 1:
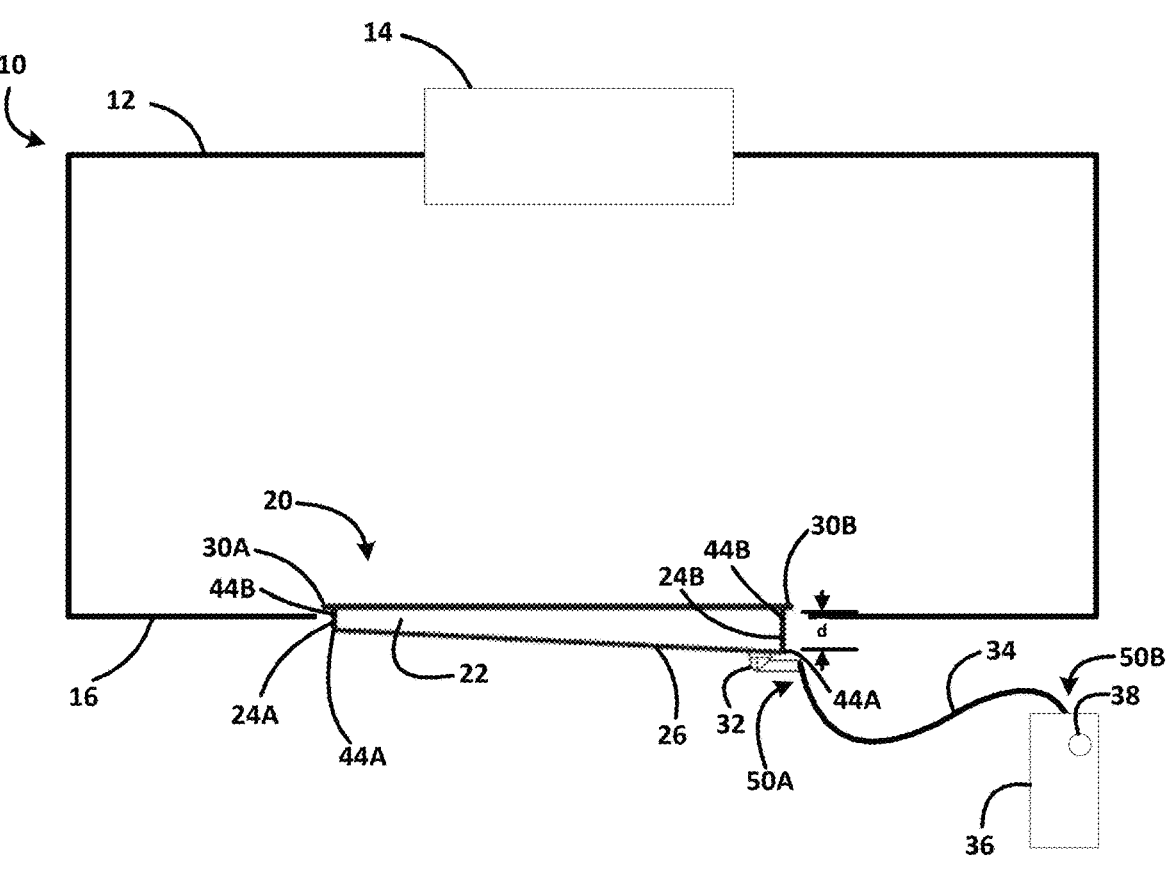
FIG. 1 is a front view of a fluid leak retention system in a cabinet including a water fixture, in accordance with one or more examples of this disclosure.

FIG. 1 shows a fluid leak retention and drainage kit 20 in use with a cabinet 12 including a water fixture 14. The water fixture can be located above the fluid leak retention and drainage kit 20 such that the kit 20 is configured to catch, retain, and/or drain liquid if liquid leaks from the water fixture and/or plumbing at least partially housed in the cabinet 12.

The fluid leak retention and drainage kit 20 can include a fluid retention body 22. The fluid retention body 22 includes an internal fluid retention volume 28. The internal fluid retention volume 28 is formed by a plurality of retention body walls 24, a sloped base 26, a lip 30, and a hose barb 32. In some embodiments, the fluid retention body 22 can be formed by an integrated single sheet of metal. Some examples of the metal comprise steel. In some embodiments, the fluid retention body 22 can include an enamel coating. Alternatively, the fluid retention body 22 can be formed by any material compatible with retaining fluid. The fluid retention body 22 can be configured to hold about 7 to about 7.4 liters of liquid. Some embodiments of the fluid retention body 22 hold about 7 liters. The fluid retention body 22 can have an opening of about 20 inches by about 14.75 inches, in certain embodiments.

The walls 24 of the fluid retention body 22 include a variety of features. For example, each retention body wall 24 has a first wall end 44A and a second wall end 44B opposite the first wall end 44A. The walls 24 can vary in length. For example, a first wall 24A can have a shorter length than a second wall 24B. In some embodiments, the first wall 24A can have a length of about 1 inch and the second wall 24B can have a length of about 2 inches. The first wall 24A can be disposed at a front area of a cabinet, and the second wall 24B can be disposed at a rear area of the cabinet.

The sloped base 26 is disposed at the first wall end 44A. The lip 30 is disposed on the second wall end 44B. The lip 30 is configured to position and/or attach the fluid retention body 22 to a fluid retention body support surface 16 (also referred to herein as a 'support substrate'). The lip 30 can be disposed above a support substrate 16 such as a cabinet floor or panel. In some embodiments, the lip 30 can be affixed to the support substrate 16 using a fastener, adhesive, or other means of attachment. When the lip 30 is fastened to the support substrate 16, a fastener (such as the exemplary fastener 146 discussed below in FIG. 3) can pass through the lip 30 via an opening (not pictured) and into the support substrate 16. Some embodiments may not include a means for affixation of the lip 30 to the cabinet floor 16. In other embodiments, the lip 30 can have an adhesive disposed thereon. The adhesive can be disposed on a surface of the lip 30 that is in contact with the support substrate 16 during use. The lip 30 can have a length. The length can be the distance the lip 30 extends away from a wall 24A, 24B. The lip can be about 1 inch to about 2 inches long. In other embodiments, the lip can be at least 0.5 inches, at least 0.75 inches, at least 1.0 inch, at least 1.5 inches, or at least 2.0 inches long.

In some embodiments, such as that of FIG. 1, the fluid retention body support surface 16 can be a cabinet floor. The cabinet floor is not integral to the fluid leak retention and drainage kit 20. The fluid retention body 22 can include features that can position the fluid retention body 22 on a fluid retention body support surface 16. For example, the first and second lips 30A, 30B can be disposed on the fluid retention body support surface 16. In some embodiments, a first lip 30A can have a length of approximately at least ½ inch. The first lip 30A can be configured to be supported at a support substrate 16. A second lip 30B can have a length of approximately 2 inches and can also be supported at a support substrate 16.

The sloped base 26 is disposed opposite the lip 30 and can include various features. The sloped base 26 defines a depth d of the fluid retention body 22. In some embodiments, the sloped base 26 can include a negative slope defined from the first wall 24A first wall end 44A to the drainage opening 42. The negative slope can be defined by the change in height from the first wall 24A first wall end 44A to the second wall 24B first wall end 44A. In some embodiments, the fluid retention body 22 can be oriented such that the first wall 24A first wall end 44A and second wall 24B first wall end 44A can each be a bottom portion of each wall 24. The sloped base 26 defines a drainage slope configured to direct fluid to the drainage opening 42. In some embodiments, the sloped base 26 can have a downward slope of about 0.0476 to about 0.05. Some embodiments of the sloped base 26 have a slope of about 0.05. The negative slope of the sloped base 26 can direct the flow of liquid collecting in the fluid retention body 22 toward the drainage opening 42.

The hose barb 32 extends from the drainage opening 42. In some embodiments, the hose barb 32 can be a curved hose barb and/or include a bend of about 15 degrees, about 30 degrees, about 45 degrees, about 60 degrees, about 75 degrees, or about 90 degrees. In other embodiments, the hose barb 32 can be generally straight. The hose barb 32 can be various configurations depending on the structural features of the location at which the kit 20 is to be used and can be any configuration to facilitate the attachment of the hose 34 to the hose barb 32.

The kit 20 includes a hose 34 attachable to the hose barb 32. The hose 34 includes a first hose end 50A and a second hose end 50B. The first hose end 50A is configured to fluidly couple to the hose barb 32 and the second hose end 50B is configured to output fluid at a location different than the internal fluid retention volume 28. The hose 34 can be any length.

In some embodiments, the kit 20 can include a leak monitoring device 36 configured to detect the presence of fluid at the location different than the internal fluid retention volume 28. The leak monitoring device 36 can be configured to contain about 3 gallons and/or about 11.5 liters of liquid. In some embodiments, the leak monitoring device 36 can include a leaked fluid quantity measurement device 38. The leaked fluid quantity measurement device 38 can be a sensor 38 configured to sense fluid. The sensor 38 can include programmable processing circuitry configured to compare the sensed quantity of fluid to a predetermined fluid volume threshold. When the sensed quantity of fluid is greater than the predetermined fluid volume threshold, the programmable circuitry can be configured to output a notification or alert to a user. The alert can be transmitted to a remote server in communication with a device of a user, such as a mobile device. In some embodiments, the hose 34 can be configured to transport fluid from the fluid retention body 22 at the first hose end 50A to the leak monitoring device 36 at the second hose end 50B.

Some embodiments of the leak monitoring device 36 and/or hose 34 can include a backflow prevention device. In some embodiments, the leak monitoring device can include a cover and/or structure including a slit or other opening (not pictured). The slit can prevent backflow of a liquid from the leak monitoring device 36. This can prevent liquid from traveling through the hose and potentially causing the fluid retention body 22 from overflowing with a liquid. Other embodiments can include a one-way valve connected to the hose 34. Additionally or alternatively, any backflow prevention method can be used.

Figure 2:
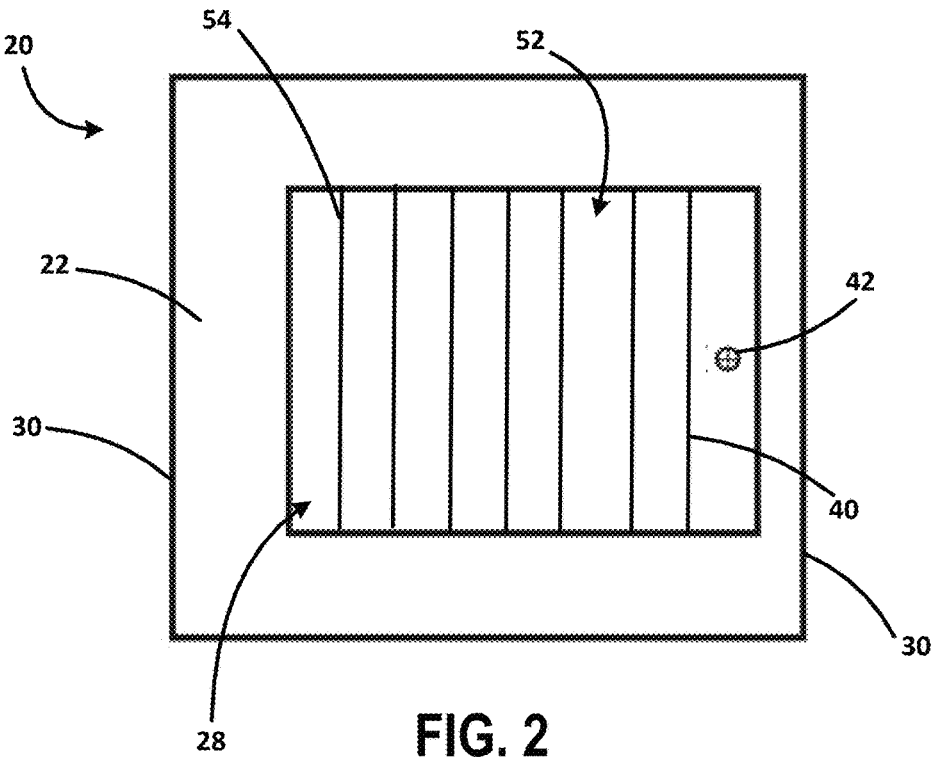
FIG. 2 is a top view of an embodiment of a fluid leak retention system, in accordance with one or more examples of this disclosure.

FIG. 2 includes an embodiment 20 including a grate 40. The grate 40 of the kit 20 can include a flat storage surface 54, a drainage opening facing surface (not pictured), and a plurality of fluid openings 52 extending from the flat storage surface 54 to the drainage opening facing surface. The grate 40 can be configured to be disposed above the fluid retention body 22. In some embodiments, the grate 40 can be fastened to the fluid retention body 22. The openings 52 can be configured to allow the passage of a liquid therethrough. The grate 40 can cover at least a portion of the fluid retention body 22. In some embodiments, the grate 40 can cover the entirety of the fluid retention body 22.

In some embodiments (such as embodiment 10 of FIG. 1), the kit 20 can be used underneath a water fixture 14 such as a sink. Often, the space underneath water fixtures 14 can be used for storage. The grate 40 can allow the space above the fluid retention body 22 to remain functional (e.g., be used for storage purposes), as the grate 40 can support various objects disposed thereon.

Figures 3, 4A:
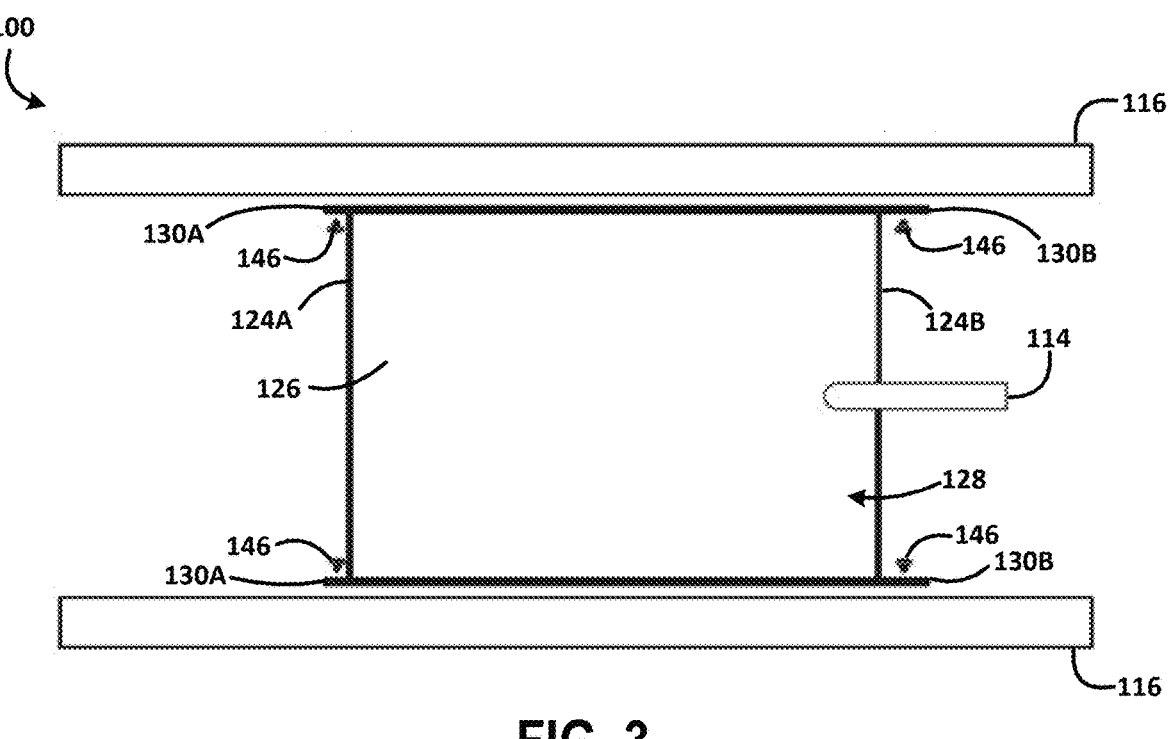
FIG. 3 is a top view of an embodiment of a fluid leak retention system, in accordance with one or more examples of this disclosure.
FIG. 4A is a side view of an embodiment of a fluid leak retention system, in accordance with one or more examples of this disclosure.

FIG. 3 shows another embodiment of a fluid leak retention and drainage kit 120 configured for use between joists 116. The kit 120 can include various features similar to features of the kit 20 of FIG. 1 and FIG. 2. For example, the kit 120 includes a fluid retention body 122 and a hose 34. The fluid retention body 122 includes an internal fluid retention volume 128. The internal fluid retention volume 128 is formed by a plurality of retention body walls 124A, 124B, a sloped base 126, at least two flanges 130A, 130B, and a hose barb 132. In some embodiments, the fluid retention body 122 can be formed by an integrated single sheet of metal. Some embodiments can include an enamel finish and/or coating on the fluid retention body 122. Enamel can be disposed on any portion of the fluid retention body 122. The enamel can be any color. In some embodiments, a user may select an enamel color based on aesthetic preferences. This can include any portion visible when the fluid retention body 122 is in use. The kit can be placed between two fluid retention body support surfaces 116 and below a water fixture 114. The water fixture 114 can be, for example, a pipe.

In a further embodiment, the fluid retention body support surface 116 can be a joist. The joist 116 is not integral to the fluid leak retention and drainage kit 120. In use, the fluid retention body 122 can be fastened to a plurality of joists 116 using a mechanical fastener 146. The mechanical fastener 146 can be a screw, in some embodiments. By positioning the fluid leak retention body 122 between two joists, a user can mitigate leaks that may otherwise be unobservable and/or undetectable. This can prevent water (or other fluids) from otherwise accumulating at an unobservable location.

Figure 4B:
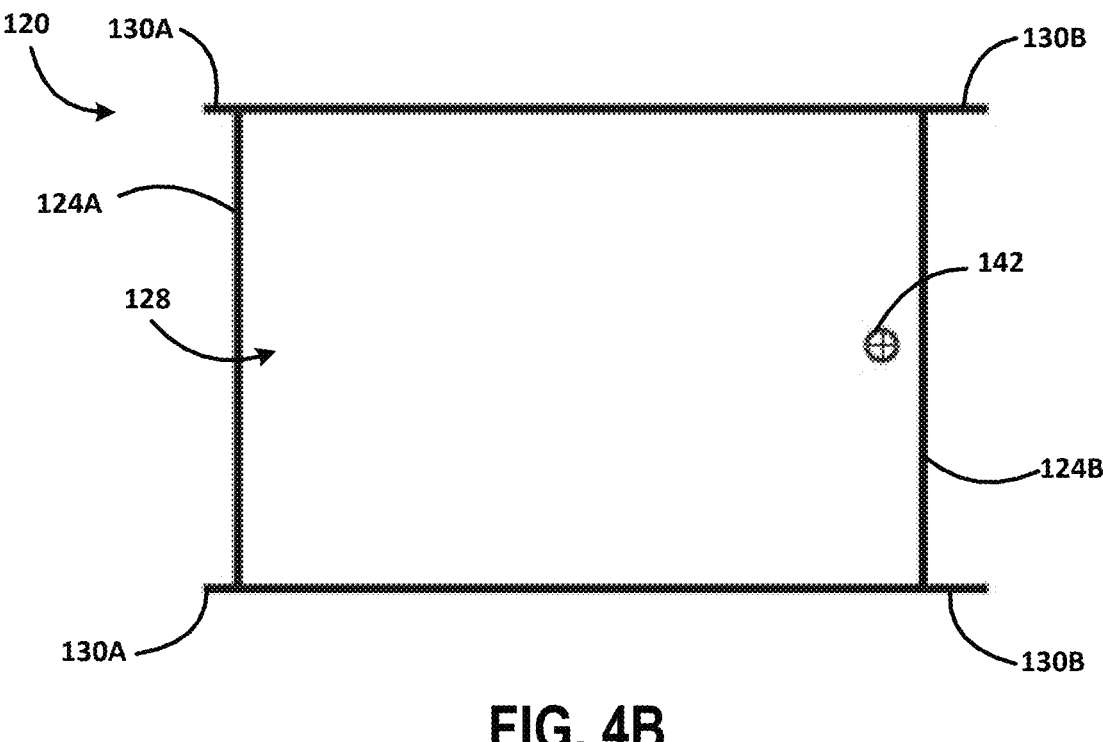
FIG. 4B is a top view of an embodiment of a fluid leak retention system, in accordance with one or more examples of this disclosure.

FIG. 4A and FIG. 4B (collectively discussed herein) show the fluid leak retention and drainage kit 120 from side and top-down views, respectively. The plurality of retention body walls 124A, 124B each include a first wall end 144A and a second wall end 144B. The sloped base 126 includes a drainage opening 142. The sloped base 126 is disposed at the first wall end 144A of the plurality of retention body walls 124A, 124B. The sloped base 126 defines a drainage slope configured to direct fluid to the drainage opening 142. This can prevent water from accumulating in the internal fluid retention volume 128 and becoming stagnant. In some embodiments, the sloped base 126 can have a negative slope defined from the first wall end 144A to the drainage opening 142.

The fluid retention body 122 of FIG. 3 can have the same or similar dimensions to the fluid retention body of FIG. 1 and FIG. 2. For example, the first wall 124A can have a height of 1 inch and the second wall 124B can have a height of 2 inches. The sloped base 126 can have a slope of about 0.05. The width of the fluid retention body 122 can be about 21 inches, not including the flanges 130A, 130B.

FIG. 4A shows the plurality of flanges 130A, 130B. The flanges 130A, 130B can include a fastener opening 148 configured to receive a fastener 146. In some embodiments, the fastener opening 148 can be configured to receive a screw or nail. The flanges 130A, 130B can extend beyond the length of the internal fluid retention volume 128 and can vary in length. A first flange 130A can have a length of about 1 inch and a second flange 130B can have a length of about 2 inches. The first flange 130A can be adjacent the first wall 124A and the second flange 130B can be adjacent the second wall 124B. In some embodiments, the flange 130 can have a same or similar length as the wall 124 to which the flange 130 is adjacent to. The flange length can be any length such that fluid retention body 122 is positioned between two joists 116 when in use.

FIG. 4A shows the hose barb 132 of the kit 120. The hose barb 132 extends from the drainage opening 142. The hose 34 is attachable to the hose barb 132. The hose 34 includes a first hose end 50A and a second hose end 50B. The hose 34 is configured to output fluid to a location different than the internal fluid retention volume 128. In some embodiments, the hose barb 132 can be disposed at approximately 90 degrees from the sloped base 126. The drainage opening 142 can have a diameter of approximately 1 inch. The drainage opening 142 can be drilled into the fluid retention body 122.

The retention body walls 124A, 124B can include a plurality of flanges 130A, 130B. The at least two flanges 130A, 130B are each disposed on two opposite retention body walls 124A, 124B. Each flange 130A, 130B is configured to attach the fluid retention body 122 to a fluid retention body support surface 116. The flanges 130A, 130B can be laterally disposed perpendicular to the retention body walls 124A, 124B.

In some embodiments, the kit 120 can include a leak monitoring device 36 such as that of FIG. 1 configured to detect the presence of fluid at the location different than the internal fluid retention volume 128. In some embodiments, the leak monitoring device 36 can include a leaked fluid quantity measurement device 38. In some embodiments, the hose 34 can be configured to transport fluid from the fluid retention body 122 at the first hose end 50A to the leak monitoring device 36 at the second hose end 50B. The kit 120 can include a backflow prevention method the same as or similar to that of FIG. 1. That is, a slit or other opening can be disposed on the leak monitoring device 36 and prevent backflow from the hose 34 into the fluid retention body 122.

While the various systems described above are separate implementations, any of the individual components, mechanisms, or devices, and related features and functionality, within the various system embodiments described in detail above can be incorporated into any of the other system embodiments herein.

Although the various embodiments have been described with reference to preferred implementations, persons skilled in the art will recognize that changes may be made in form and detail without departing from the spirit and scope thereof.

What is claimed is:

1. A fluid leak retention and drainage kit, comprising:
   (a) a fluid retention body comprising an internal fluid retention volume, the internal fluid retention volume being formed by:
      (i) a plurality of retention body walls each comprising a first wall end and a second wall end, the plurality of retention body walls including a first wall having a first length and a second wall having a second length different than the first length;
      (ii) a sloped base comprising a drainage opening, the sloped base disposed at the first wall end of each of the plurality of retention body walls, and wherein the sloped base defines a drainage slope that is configured to direct fluid toward the drainage opening, the sloped base being defined by the change in height from the first wall first end to the second wall first end;
      (iii) a lip disposed on the second wall end of each of the plurality of retention body walls, the lip configured to attach the fluid retention body to a fluid retention body support surface such that the lip is positioned above the fluid retention body support surface; and
      (iv) a hose barb extending from the drainage opening in a direction away from the sloped base;
   (b) a hose attachable to the hose barb, the hose comprising a first hose end and a second hose end, wherein the first hose end is configured to fluidly couple to the hose barb and the second hose end is configured to output fluid at a location away from the internal fluid retention volume, and
   (c) a leaked fluid quantity measurement device configured to detect the (c) presence of fluid at the location away from the internal fluid retention volume,
   wherein the fluid retention body is configured to be disposed at least partially within an area defined by the fluid retention body support surface.

2. The fluid leak retention and drainage kit of claim 1, further comprising a grate comprising:
   (a) a flat storage surface;
   (b) a drainage opening facing surface; and
   (c) a plurality of fluid openings extending from the flat storage surface to the drainage opening facing surface, wherein the grate is configured to be disposed above the fluid retention body.

3. The fluid leak retention and drainage kit of claim 2, wherein the grate covers at least portion of the fluid retention body.

4. The fluid leak retention and drainage kit of claim 1, wherein the fluid retention body support surface is a cabinet floor, the cabinet floor not being integral to the fluid leak retention and drainage kit.

5. The fluid leak retention and drainage kit of claim 1, wherein the sloped base comprises a negative slope defined from the first wall end of the first wall to the drainage opening.

6. The fluid leak retention and drainage kit of claim 1, wherein
   (a) a first lip comprises a length of approximately at least 2 inches, such that the first lip is configured to be supported at a support substrate; and
   (b) a second lip comprises a length of approximately 2 inches.

7. The fluid leak retention and drainage kit of claim 1, wherein the fluid retention body is formed by an integrated single sheet of metal.

8. A fluid leak retention and drainage kit comprising:
   (a) a fluid retention body comprising an internal fluid retention volume, the internal fluid retention volume being formed by:
      (i) a plurality of retention body walls each comprising a first wall end and a second wall end;
      (ii) a sloped base comprising a drainage opening, the sloped base disposed at the first wall end of each of the plurality of retention body walls, and wherein the sloped base defines a drainage slope that is configured to direct fluid toward the drainage opening;
      (iii) a lip disposed on the second wall end of each of the plurality of retention body walls, the lip configured to attach the fluid retention body to a fluid retention body support surface; and (iv) a hose barb extending from the drainage opening in a direction away from the sloped base;

(b) a hose attachable to the hose barb, the hose comprising a first hose end and a second hose end, wherein the first hose end is configured to fluidly couple to the hose barb and the second hose end is configured to output fluid at a location away from the internal fluid retention volume; and (c) a leak monitoring device configured to detect the presence of fluid at the location away from the internal fluid retention volume, wherein the leak monitoring device comprises a leaked fluid quantity measurement device.

9. The fluid leak retention and drainage kit of claim 8, wherein the hose is configured to transport fluid from the fluid retention body at the first hose end to the leaked fluid quantity measurement device at the second hose end.

10. A fluid leak retention and drainage kit, comprising:

(a) a fluid retention body comprising an internal fluid retention volume, the internal fluid retention volume being formed by:

(i) a plurality of retention body walls each comprising a first wall end and a second wall end;

(ii) a sloped base comprising a drainage opening, the sloped base disposed at the first wall end of each of the plurality of retention body walls, and wherein the sloped base defines a drainage slope that is configured to direct fluid toward the drainage opening;

(iii) a first flange; and a second flange, wherein:

the first flange extends from a first retention body wall and comprises a first flange height defined by the distance from the first wall end to the second wall end of the first retention body wall, the first flange extending along the first retention body wall from the first wall end of the first retention body wall to the second wall end of the first retention body wall, the second flange extends from a second retention body wall and comprises a second flange height defined by the distance from the first wall end to the second wall end of the second retention body wall, the second flange extending along the second body wall from the first wall end of the second retention body wall to the second wall end of the second retention body wall, and each flange is configured to attach the fluid retention body to a fluid retention body support surface at a vertical plane of the fluid retention body support surface; and (iv) a hose barb extending from the drainage opening in a direction away from the sloped base;

(b) a hose attachable to the hose barb, the hose comprising a first hose end and a second hose end, wherein the hose is configured to output fluid to a location away from the internal fluid retention volume; and (c) a leaked fluid quantity measurement device configured to detect the presence of fluid at the location away from the internal fluid retention volume.

11. The fluid leak retention and drainage kit of claim 10, wherein the fluid retention body support surface comprises a joist, the joist not being integral to the fluid leak retention and drainage kit.

12. The fluid leak retention and drainage kit of claim 11, wherein the first flange extends outwardly from the first retention body wall a first flange protrusion length and the second flange extends outwardly from the second retention body wall a second flange protrusion length, and wherein the first flange protrusion length of the first flange is less than the second flange protrusion length of the second flange.

13. The fluid leak retention and drainage kit of claim 10, wherein each flange comprises a fastener opening configured to receive a fastener.

14. The fluid leak retention and drainage kit of claim 10, wherein the hose barb is disposed at approximately 90 degrees from the sloped base, and wherein the drainage opening has a diameter of approximately 1 inch.

15. The fluid leak retention and drainage kit of claim 11, wherein the hose is configured to transport fluid from the fluid retention body at the first hose end to the leaked fluid quantity measurement device at the second hose end.

16. The fluid leak retention and drainage kit of claim 10, wherein the fluid retention body is formed by an integrated single sheet of metal.

17. The fluid leak retention and drainage kit of claim 10, wherein the sloped base comprises a negative slope defined from the first wall end to the drainage opening.

* * * * *